J. L. BERNARD.
ADJUSTING CLAMP OR NUT.
APPLICATION FILED SEPT. 19, 1907.

968,113.

Patented Aug. 23, 1910.

WITNESSES
R. A. Balderson
G. B. Bleming

INVENTOR
Jas. L. Bernard
by Bakewell, Byrnes & Parmelee,
his attys.

UNITED STATES PATENT OFFICE.

JAMES L. BERNARD, OF AMBRIDGE, PENNSYLVANIA.

ADJUSTING CLAMP OR NUT.

968,113.  Specification of Letters Patent.  Patented Aug. 23, 1910.

Application filed September 19, 1907. Serial No. 393,753.

*To all whom it may concern:*

Be it known that I, JAMES L. BERNARD, of Ambridge, Beaver county, Pennsylvania, have invented a new and useful Adjusting Clamp or Nut, of which the following is a full, clear, and exact description, reference being had to the accompanying drawings, forming part of this specification.

My invention relates primarily to apparatus used in fitting shops in "stitching" or temporarily securing members of a fabricated structure together in assembled relation preparatory to permanently securing these members together by riveting, or otherwise.

The object of my invention is to provide a simple and convenient clamp or nut which can be used in connection with a round, square, or other shaped bolt or rod, which, together with the part engaged therewith, can be secured without threads.

Figure 1:
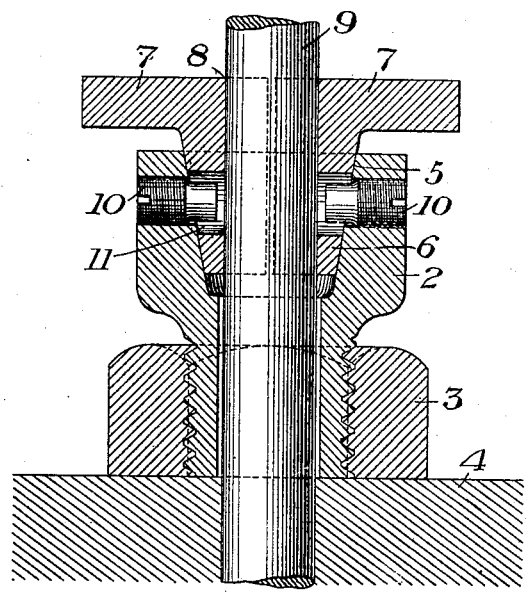
Figure 3:
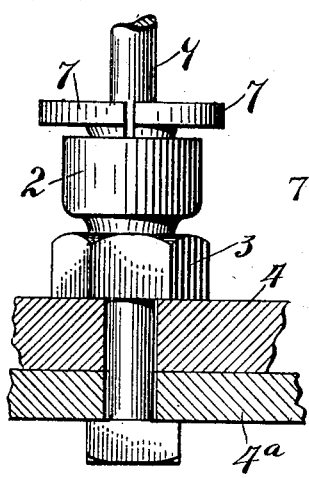
Figure 2:
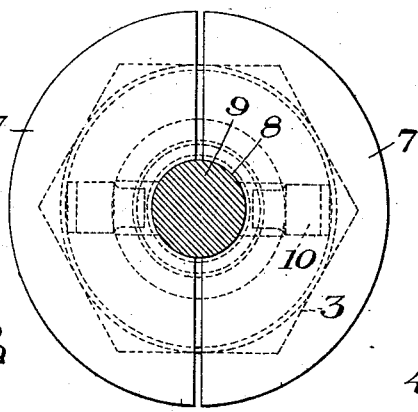
Figure 4:
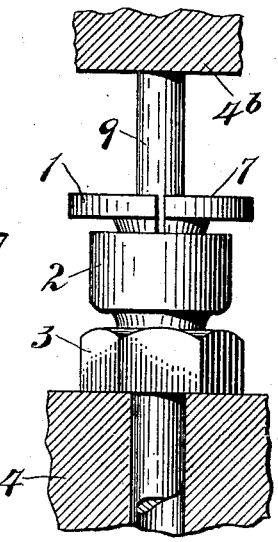

Figure 1 is a sectional view of a nut or clamp embodying my invention. Fig. 2 is an end view of the same. Fig. 3 is a side elevation showing one use to which my improved clamp can be put. Fig. 4 is a similar view showing another way in which the invention can be applied for use.

Referring to the drawings, the numeral 2 designates a sleeve which is externally threaded at one end portion to receive a nut 3, which seats against the part 4, which is to be bolted or clamped.

The opposite end portion of the sleeve is exteriorly enlarged, and is formed with a tapered socket or seat 5, to receive the frusto-conical portion 6 of a clamping member 7. The clamping member 7 is a split member which can be made in two or more pieces. In the present instance, I have shown it as formed in two pieces. It is formed with an opening 8 to receive the rod or bolt 9 which passes therethrough and through the sleeve. The walls of this opening may be either plain or serrated, or a combination of plain and serrated surfaces, for engagement with the rod or bolt.

The operation is as follows:—The parts assembled as shown in Fig. 1 are pushed or dropped over the end of the bolt or rod, the nut 3 coming against the part 4 to be bolted or clamped. The clamping member 7 is then tapped with a hammer or other member to cause it to enter into its recess or seat and grip the bolt or nut. A wrench is then applied to the nut 3 and the latter is turned or backed against the member 4, thereby first moving the sleeve to clamp the member 7 tightly against the bolt and then moving the sleeve or bolt relatively to the part 4.

In using the apparatus as shown in Fig. 3, the bolt 9 is provided with a head on one end. The bolt is threaded through suitable openings in the parts 4, 4ª, which are to be clamped together and the assembled clamp is moved longitudinally on the bolt 9 until the nut 3 is in engagement with the one surface of the part 4. After the clamping members 7 are moved into engagement with the bolt 9 as tightly as may be the nut 3 is turned on the sleeve 2 so as to first jam the clamping member tightly on the bolt 9 and then draw the parts 4, 4ª into engagement and hold these parts in such position until the parts have been secured together by riveting or bolting, or otherwise.

In using my improved clamp as shown in Fig. 4, one end of the rod or bolt 9 is placed against the surface 4ᵇ and the clamp is moved on the rod 9 until the nut 3 is contacting with the part 4 which is being clamped. The clamping members 7 are then moved into clamping engagement with the rod 9 as tightly as may be and the nut 3 is then turned upon the sleeve 2 so as to tightly jam the clamping faces of the clamping member 7 into engagement with the rod 9. Further movement of the nut 3 on the sleeve member 2 will force and securely hold the part 4 in the desired position.

The sections of the clamping member 7 may conveniently be prevented from falling out of the sleeve 2 when not in use by providing the latter with the stud-screws 10, whose ends loosely engage the slots 11 in the tapered portion of the clamping member.

In releasing the clamp the end of a wrench or other tool is inserted between the clamping member 7 and the top edge of the sleeve 2 so as to move the clamping member 7 relatively to the sleeve and release the rod 9. The sleeve and clamping member are then removed from the bolt 9 without the necessity for unscrewing the threaded nut.

The device forms a simple and convenient nut or clamp, which is adapted for a variety of uses where it is not desired to provide the parts with threads.

Various changes may be made in the details of construction and arrangement of parts without departing from the spirit and scope of my invention, since

What I claim is:—

In a clamping device a sleeve having an exteriorly threaded portion at one end, a tapering socket in its opposite end, a split clamping member in said socket having an opening therethrough for the part to be clamped, the sleeve and clamping member having engaging portions permitting a limited relative endwise movement of the parts, and means on the exteriorly threaded portion of the sleeve capable of being projected beyond the end of the sleeve in moving the sleeve backwardly; substantially as described.

In testimony whereof, I have hereunto set my hand.

JAS. L. BERNARD.

Witnesses:
ARTHUR P. HUME,
LEE C. JONES.